(12) United States Patent
Liu et al.

(10) Patent No.: US 9,678,521 B2
(45) Date of Patent: Jun. 13, 2017

(54) EXTERNAL RAMP AUTOTUNING FOR CURRENT MODE CONTROL OF SWITCHING CONVERTER

(71) Applicant: Virginia Tech Intellectual Properties, Inc, Blacksburg, VA (US)

(72) Inventors: Pei-Hsin Liu, Blacksburg, VA (US); Fred C. Lee, Blacksburg, VA (US); Yingyi Yan, Blacksburg, VA (US); Paolo Mattavelli, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 114 days.

(21) Appl. No.: 14/050,435

(22) Filed: Oct. 10, 2013

(65) Prior Publication Data

US 2014/0306680 A1    Oct. 16, 2014

Related U.S. Application Data

(60) Provisional application No. 61/812,031, filed on Apr. 15, 2013.

(51) Int. Cl.
| | | |
|---|---|---|
| *H02M 3/157* | (2006.01) | |
| *G05F 1/46* | (2006.01) | |
| *H02M 3/156* | (2006.01) | |
| *H02M 1/00* | (2006.01) | |

(52) U.S. Cl.
CPC ............ *G05F 1/468* (2013.01); *H02M 3/156* (2013.01); *H02M 3/157* (2013.01); *H02M 2001/0012* (2013.01); *H02M 2001/0025* (2013.01)

(58) Field of Classification Search
CPC ...................... H02M 3/157; H02M 2001/0012
USPC .......................... 323/271, 282, 272, 284, 283
See application file for complete search history.

(56) References Cited

U.S. PATENT DOCUMENTS

| | | | | |
|---|---|---|---|---|
| 6,373,729 | B1* | 4/2002 | Shimazaki | H02J 3/38 363/37 |
| 8,575,911 | B2* | 11/2013 | Cheng | H02M 1/14 323/283 |
| 8,604,766 | B2* | 12/2013 | Shiraishi | G05F 1/468 323/283 |
| 8,970,194 | B2* | 3/2015 | Li | G05F 1/575 323/282 |
| 2010/0253296 | A1* | 10/2010 | Huang | H02M 3/1588 323/225 |

(Continued)

*Primary Examiner* — Harry Behm
*Assistant Examiner* — Bryan R Perez
(74) *Attorney, Agent, or Firm* — Whitham, Curtis & Cook, P.C.

(57) ABSTRACT

Peak current, valley current or average current mode controlled power converters in either digital or analog implementations obtain a stabilized feedback loop and allow high system bandwidth design by use of an external ramp generator using a slope computation equation or design parameters based on fixing the quality factor of a double pole at one-half of the switching frequency at a desired value The slope of the external ramp waveform is tuned automatically with knowledge of the slope change in the waveform of inductor current of a power converter derived by differentiating a waveform in the current feedback loop. This autotuning of the external ramp generator provides immunity of quality factor change under variations of duty cycle, component values of topological change of the power converter.

8 Claims, 9 Drawing Sheets

(56) References Cited

U.S. PATENT DOCUMENTS

2011/0187339 A1\* 8/2011 Trattler ................ H02M 3/156
                                                         323/283

\* cited by examiner

Table 1. Tracking performance of digital autotuning block to duty cycle variation

| D | $S_e$ change with D | | | Resultant Q with $S_e$ change | | |
|---|---|---|---|---|---|---|
| | Calculation (V/Sec) | Simulation (V/Sec) | Error (%) | Calculation | Simulation | Error (%) |
| 0.2 | 21360 | 22000 | +2.99 | 0.9947 | 0.9929 | -0.18 |
| 0.5 | 140533 | 140800 | +0.18 | 0.9947 | 0.9928 | -0.19 |
| 0.8 | 170461 | 170320 | -0.08 | 0.9947 | 0.9968 | +0.21 |

Table 2. Tracking performance of digital autotuning block to component tolerance variation

| $R_i/L$ | $S_e$ change with $R_i/L$ | | | Resultant Q with $S_e$ change | | |
|---|---|---|---|---|---|---|
| | Calculation (V/Sec) | Simulation (V/Sec) | Error (%) | Calculation | Simulation | Error (%) |
| 0.8 | 112461 | 112640 | +0.15 | 0.9947 | 0.9932 | -0.15 |
| 1 | 140533 | 140800 | +0.18 | 0.9947 | 0.9928 | -0.19 |
| 1.5 | 210557 | 209920 | -0.3 | 0.9947 | 0.9970 | -0.23 |

Remark: D=0.5

Table 3. Tracking performance of digital autotuning block to topological change

| Mode | $S_e$ change with topology | | | Resultant Q with $S_e$ change | | |
|---|---|---|---|---|---|---|
| | Calculation (V/Sec) | Simulation (V/Sec) | Error (%) | Calculation | Simulation | Error (%) |
| Buck | 170461 | 170320 | -0.08 | 0.9947 | 0.9968 | +0.21 |
| Boost | 45840 | 45120 | -1.57 | 0.9947 | 0.9954 | +0.07 |

Remark: Buck mode: $V_{in}$=4V, $V_o$=3.3V; Boost mode: $V_{in}$=2V, $V_o$=3.3V

Figure 11

Table 4. Tracking performance of analog autotuning block to duty cycle change

| D | $S_e$ change with D | | | Resultant Q with $S_e$ change | | |
|---|---|---|---|---|---|---|
| | Calculation (V/Sec) | Simulation (V/Sec) | Error (%) | Calculation | Simulation | Error (%) |
| 0.2 | 21360 | 21592 | +1.08 | 0.9947 | 0.9940 | -0.07 |
| 0.5 | 140533 | 140574 | +0.03 | 0.9947 | 0.9944 | -0.03 |
| 0.8 | 170461 | 170228 | -0.13 | 0.9947 | 0.9970 | +0.23 |

Table 5. Tracking performance of analog autotuning block to component tolerance variation

| $R_i/L$ | $S_e$ change with $R_i/L$ | | | Resultant Q with $S_e$ change | | |
|---|---|---|---|---|---|---|
| | Calculation (V/Sec) | Simulation (V/Sec) | Error (%) | Calculation | Simulation | Error (%) |
| 0.8 | 112461 | 112484 | +0.02 | 0.9947 | 0.9945 | -0.02 |
| 1 | 140533 | 140574 | +0.03 | 0.9947 | 0.9944 | -0.03 |
| 1.5 | 210557 | 210675 | +0.05 | 0.9947 | 0.9943 | -0.04 |

Remark: D=0.5

Table 6. Tracking performance of analog autotuning block to topological change

| Mode | $S_e$ change with topology | | | Resultant Q with $S_e$ change | | |
|---|---|---|---|---|---|---|
| | Calculation (V/Sec) | Simulation (V/Sec) | Error (%) | Calculation | Simulation | Error (%) |
| Buck | 170461 | 170228 | -0.13 | 0.9947 | 0.9970 | +0.23 |
| Boost | 45840 | 45807 | -0.07 | 0.9947 | 0.9954 | +0.07 |

| | Quality factor | Control law for External ramp calculation (Se) | Parameter design for Analog autotuning block |
|---|---|---|---|
| Peak current mode | $Q = \dfrac{1}{\pi\left(\dfrac{s_n + s_e}{s_n + s_f} - 0.5\right)}$ ---- (1) | $S_e = (\dfrac{1}{Q\pi} + 0.5) \cdot s_f + (\dfrac{1}{Q\pi} - 0.5) \cdot s_n$ ---- (2) | $(\dfrac{1}{Q\pi} + 0.5) = \dfrac{G_m K_d K_{p1}}{C_{Ramp}}$ ---- (3)<br>$(\dfrac{1}{Q\pi} - 0.5) = \dfrac{G_m K_d K_{p2}}{C_{Ramp}}$ ---- (4) |
| Valley current mode | $Q = \dfrac{1}{\pi\left(\dfrac{s_f + s_e}{s_n + s_f} - 0.5\right)}$ ---- (5) | $S_e = (\dfrac{1}{Q\pi} + 0.5) \cdot s_n + (\dfrac{1}{Q\pi} - 0.5) \cdot s_f$ ---- (6) | $(\dfrac{1}{Q\pi} + 0.5) = \dfrac{G_m K_d K_{p1}}{C_{Ramp}}$ ---- (7)<br>$(\dfrac{1}{Q\pi} - 0.5) = \dfrac{G_m K_d K_{p2}}{C_{Ramp}}$ ---- (8) |
| Average current mode | $Q = \dfrac{1}{\pi\left(\dfrac{(\dfrac{R_z}{R_A} s_n) + s_e}{(\dfrac{R_z}{R_A} s_n) + (\dfrac{R_z}{R_A} s_f)} - 0.5\right)}$ | $S_e = (\dfrac{1}{Q\pi} + 0.5) \cdot (\dfrac{R_z}{R_A} s_f) + (\dfrac{1}{Q\pi} - 0.5) \cdot (\dfrac{R_z}{R_A} s_n)$ | $(\dfrac{1}{Q\pi} + 0.5) = \dfrac{G_m K_d K_{p1}}{C_{Ramp}} \cdot \dfrac{R_A}{R_z}$ ---- (9)<br>$(\dfrac{1}{Q\pi} - 0.5) = \dfrac{G_m K_d K_{p2}}{C_{Ramp}} \cdot \dfrac{R_A}{R_z}$ ---- (10) |

*Figure 15*

EXTERNAL RAMP AUTOTUNING FOR CURRENT MODE CONTROL OF SWITCHING CONVERTER

CROSS-REFERENCE TO RELATED APPLICATIONS

This application claims benefit of priority of U.S. Provisional Application 61/812,031, filed Apr. 15, 2013 which is hereby incorporated by reference in its entirety.

FIELD OF THE INVENTION

The present invention generally relates to control of switching power converters and, more particularly, to automatic tuning of a ramp signal which stabilizes operation of the power converter when operated under current mode control.

BACKGROUND OF THE INVENTION

Many familiar electronic devices or controls therefor operate on power that must be provided at a substantially constant voltage. such a substantially constant voltage must generally be derived from alternating current (AC) power distribution systems, often referred to as the grid, where power is provided as a periodically varying voltage for efficiency of power transmission over substantial distances, or batteries which provide power at a voltage which varies more-or-less slowly with the state of charge of the battery or the amount of potential energy stored in their constituent materials. Therefore, a power converter must be used to derive the substantially constant voltage required and many different types of power converters, sometimes referred to as voltage regulators have been developed of both analog and switching types. In general, switching type power converters are generally preferred at the present time since they are much more efficient than analog regulators which develop a voltage drop and thus consume power that must be dissipated as heat when current is drawn through them.

Many different topologies of switching power converters have been developed in recent years and a number of different control techniques have also been developed. Among known control techniques, current mode control is often favored because of the simple loop compensation, good current sharing and current limiting it provides. However, when the duty cycle of a switching power converter is above 0.5 for peak current mode control (or below 0.5 for valley current mode control) subharmonic oscillations occur due to the double pole at one-half the switching frequency in control-to-inductor current transfer function that is moved to the right half-plane. Therefore, it is conventional to include an externally developed ramp function in the feedback loop to assist in stabilizing the system. Conventionally, a fixed external ramp slope, $s_e$ is chosen based on compensation for the worst-case duty cycle and component tolerance change or variation and thus such a slope will cause over compensation under normal conditions; reducing current loop strength and weakening the benefit of current mode control. The quality factor of the double pole is also reduced under normal conditions and becomes very low, causing significant drop in gain and phase drop in the transfer function which, in turn reduces system bandwidth. To minimize the impact of the fixed ramp slope based on worst case conditions, several ramp strategies have been proposed.

All known strategies for adaptively altering ramp slope to avoid overcompensation require accurate a priori knowledge of the Ri/L ratio to achieve good tracking performance. However, these values can easily vary over a range of 80% to 150% of a nominal value since variation includes changes to component value tolerance, temperature change and bias condition of real components. Further, the percentage tracking error is proportional to real Ri/L tolerance and the tracking error, in turn, causes wide quality factor variation which results in a significant phase error and double pole peaking in the control-to-inductor current transfer function. The peaking in the transfer function also limits the bandwidth of the system.

Another complicating factor at the present time is the fact that a different analysis and compensation of the external ramp slope is required for different power converter topologies in combination with the fact that power converters that can operate with different topologies are currently favored for many applications. For example, a so-called buck-boost converter operates as a buck converter when battery voltage is above a required voltage and operates as a boost converter when battery voltage is below required voltage so that battery utility can be extended.

SUMMARY OF THE INVENTION

It is therefore an object of the present invention to provide a method of external ramp signal adjustment which is adaptive to avoid over-compensation under component tolerance and/or value change due to operating conditions, duty cycle variation and/or topological change so that stable and high system bandwidth can be achieved in current mode power converters.

In order to accomplish these and other objects of the invention, an autotuning arrangement for an external ramp generator for stabilizing a current mode controller for a power converter is provided, comprising a circuit to produce a waveform directly corresponding to a slope of a waveform in a current feedback loop of a power converter, a circuit to determine and store a value of the waveform corresponding to the slope of the waveform in the current feedback loop, and an arrangement for controlling a slope of an external ramp waveform required to produce a desired quality factor value in a transfer function of the current feedback loop in accordance with the value corresponding to the value of the slope of the waveform in the current feedback loop.

In accordance with another aspect of the invention, a power converter having current mode control comprising a power converter circuit having a current feedback loop, an external ramp generator for stabilizing said power converter, and an autotuning arrangement to automatically tune said external ramp generator comprising a circuit to produce a waveform directly corresponding to a slope of a waveform in a current feedback loop of a power converter, a circuit to determine and store a value of the waveform corresponding to the slope of the waveform in the current feedback loop, and an arrangement for controlling a slope of an external ramp waveform required to produce a desired quality factor value in a transfer function of the current feedback loop in accordance with the value corresponding to the value of the slope of the waveform in the current feedback loop.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
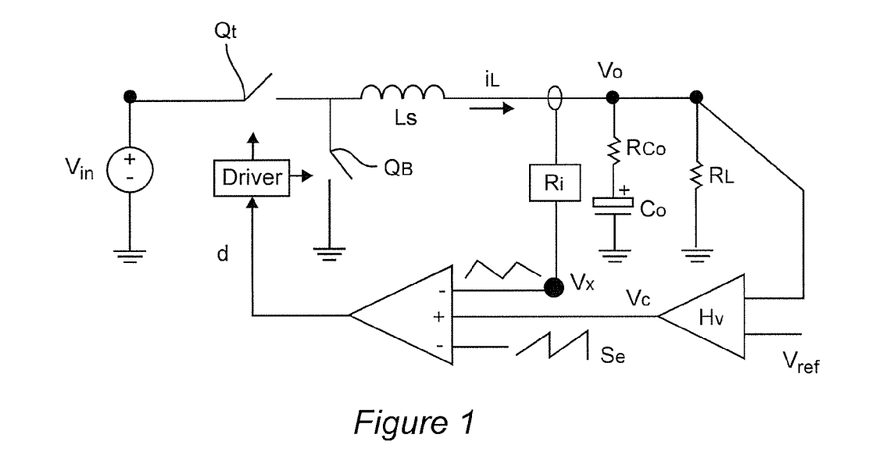
FIG. 1 is a schematic/block diagram of a buck topology power converter with generalized peak current mode control, FIGS. 2A and 2B graphically illustrate the impact of component tolerance change of tracking performance and quality factor, respectively, FIGS. 3A and 3B graphically illustrate impact of quality factor variation due to component tolerance on control-to-inductor current transfer function and open loop gain respectively.

Referring now to the drawings, and more particularly to FIG. 1, there is schematically shown a block diagram of a buck converter with analog peak current mode control. It should be understood that a buck converter has been chosen for its simplicity for purposes of this discussion and any converter topology could be used in implementation of the invention. It should also be understood that FIG. 1 is arranged to facilitate an understanding of the invention as well as to be generalized in regard to various approaches to current mode control and therefore, no portion of FIG. 1 or the graphical depictions of the performance of various approaches to current mode control shown in FIG. 2A, 2B, 3A or 3B is admitted to be prior art in regard to the present invention.

A buck converter operates by periodically connecting an inductor and a series connected load to a source of direct current (DC) voltage that provides a voltage which is above the voltage required. When such a connection is made through a first switch (often referred to as a top switch, $Q_T$) an increasing current will flow through the inductor and the voltage developed across the inductor will reduce of buck the voltage applied to the load. When the voltage source is disconnected from the inductor, the current (often referred to as a freewheel current) provided through another switch (often referred to as a bottom switch, $Q_B$) decreases and the voltage developed across the inductor supplies additional current to the load. A capacitor, Co, is typically used as a filter to reduce the current ripple due to the increasing and decreasing currents and thus delivers a near-constant voltage to the load. However, the capacitor will inherently present some inherent resistance and, therefore, some amount of ripple voltage and current will remain. The voltage applied to the load is controlled by feedback of the output voltage of the converter which is compared at compensator, Hv, with a reference voltage, $V_{ref}$, to derive a control voltage $V_c$ which is connected to a comparator that outputs a variable duty cycle signal based on whether $V_c$ is larger or smaller than a reference voltage $V_x$. For current mode control of the converter, the reference signal $V_x$ is derived from a current sensor through a feedback path with current sensing gain, Ri, and will thus provide a triangular waveform based on the current in the inductor. Either the peaks or valleys of the triangular reference signal $V_x$ can be tracked to provide a reference signal. However, as alluded to above, to provide desired control characteristics, the transfer functions from control signal, Vc, to reference voltage Vx, from Vc to inductor current $i_L$, and from Vc to output voltage V0, must be designed with a double pole at one-half the switching frequency that is moved to the right half-plane. Therefore, when the duty cycle reaches and/or exceeds 0.5 for peak current control or is equal to or less than 0.5 for valley current control, subharmonic oscillation will occur. Accordingly, to help stabilize the system, an external ramp with a slope $s_e$ must be provided and the slope $s_e$ designed for the worst case conditions of circuit component value variation and duty cycle change. However, such design criteria cause over-compensation under normal and less extreme conditions which reduces current loop strength and reduces the benefit of current mode control. The quality factor of the double pole becomes very low under normal conditions and causes loss of gain and phase drop of the transfer function, thus limiting bandwidth of the system.

To reduce such impacts of over-compensation, several strategies for adaptively altering external ramp slope based on duty cycle have been proposed. One proposal for adaptively altering external ramp slope is to provide for a non-linear (e.g. quadratic or piecewise linear) external ramp and such an approach has been widely used in commercial power converter controllers. In such an approach, $s_e$ is made to follow the inductor current slope during the off time period (e.g. of the top switch), $s_f$, such that $s_e = s_f$. However, the derived quadratic equation or the non-linear ramp function depends on accurate or predictable parameters such as input voltage, switching frequency, inductance and current sensing gain, Ri, of the current loop transfer function to achieve good tracking performance. Further, different power converter topologies require different quadratic equations.

Another approach is referred to as the emulated ramp approach which generates an artificial ramp, $s_x$, to emulate the sum of $s_f$ and the slope of the inductor current during the "on" time period, $s_n$, which is then compared with the control voltage. The $s_x$ equation shows that it is independent of the switching frequency but still requires accurate values of L and Ri to achieve good tracking performance. In addition, this approach samples only the valley current information and peak current information is lost. Therefore, peak current protection cannot be provided through this emulated ramp approach. Further, different equations for $s_x$ are required for different power converter topologies.

Yet another approach is referred to as the emulated reference approach which tracks $s_e = s_f$ in a digital implementation wherein an artificial control voltage, $V_{c\_new}$, is generated which contains desired $s_e$ information to compare with inductor current feedback. However, to obtain a simple expression for $s_n/s_f$ in the equation for $V_{c\_new}$, it is assumed that Ri/L is constant, which is not the case under realistic operating conditions. This approach can only be performed digitally and requires a division calculation to be performed twice and two analog to digital converters are required, making the approach complex and costly as well as limiting response time. Moreover, when converter topology changes operationally, the change must be detected and a different expression for $s_n/s_f$ must be used.

Figure 2A:
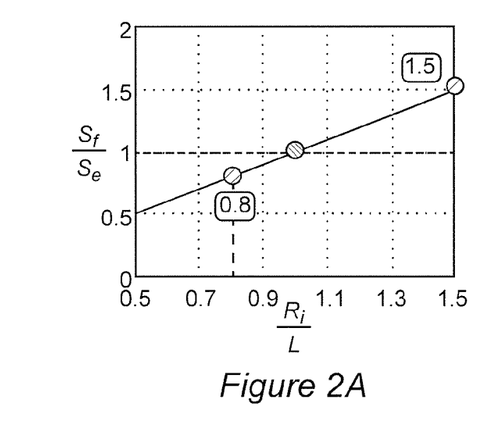
Figure 2B:
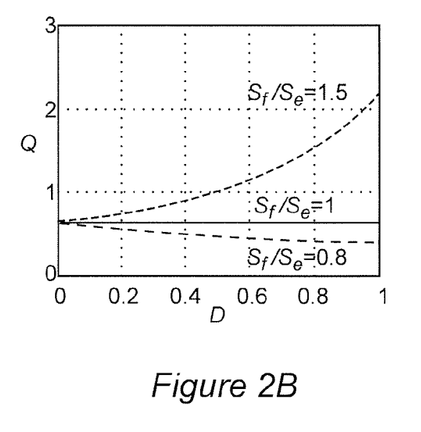
Figure 3A:
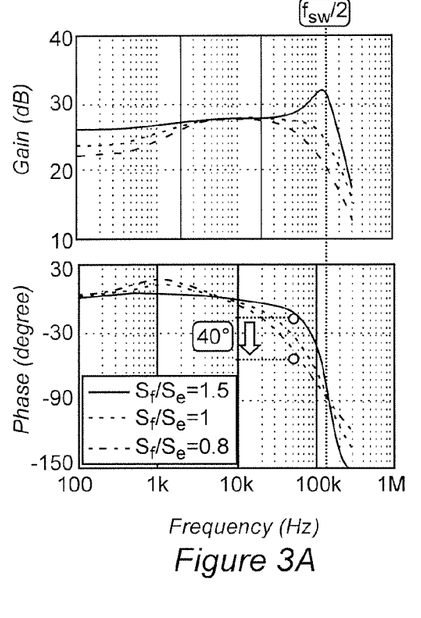
Figure 3B:
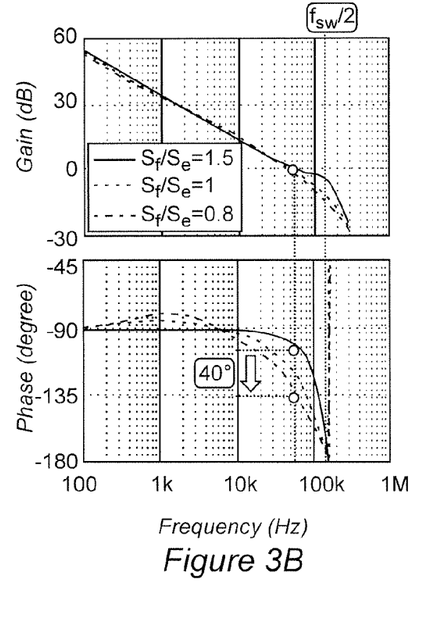

A common issue of the three approaches summarized above is the requirement of an accurate value of the Ri/L ratio to achieve good tracking performance. However, in real circuits, both Ri and L are subject to substantial variation due to variations in component values and tolerance, particularly under variable ambient and operational conditions such as manufacturing tolerance, temperature and bias conditions. For example, for a realistic variation in the value of Ri/L of 80% to 150% of a nominal value, the tracking performance illustrated in FIG. 2A shows that the tracking error percentage is directly related to the Ri/L tolerance. As a result of the tracking error, a wide variation in quality factor is caused as shown in FIG. 2B. The variation in quality factor, in turn, causes a 40° phase difference/shift and double pole peaking on the control-to-inductor current transfer function as shown in FIG. 3A. To prevent risk of instability from phase drop and second crossover by the loop gain as shown in FIG. 3B, the system bandwidth must also be limited. Thus, it is seen that overall performance is still severely compromised by over-compensation that is substantially inherent in all three of the approaches summarized above since Ri/L of real circuits is inherently subject to significant variation.

Another issue common to the three approaches summarized above is that different control circuitry is necessary for different converter topologies; which topologies may be subject to changes through change of mode of operation rather than physical circuit topology change such as in the case of buck-boost converters alluded to above which are becoming more widespread for battery powered systems such as electric vehicles, portable devices and telecommunications. Therefore, it is of increasing importance to develop a tuning method for current mode control of power converters that provides improved tracking performance for duty cycle change and which is insensitive to component tolerance while being able to automatically and seamlessly accommodate converter topology change.

Figure 4:
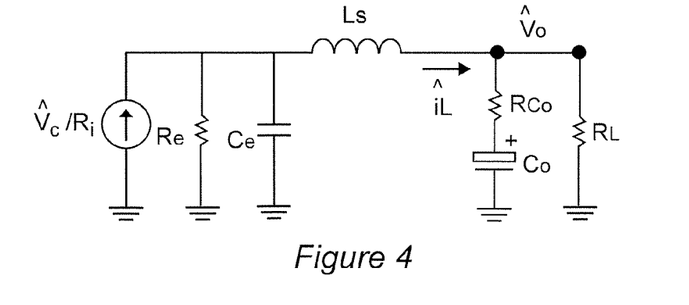
FIG. 4 is a simplified schematic diagram of a three-terminal switch model for current mode control, FIGS. 5A and 5B graphically illustrate immunity of the invention to component tolerance change and converter topology change, respectively.

A switch model is disclosed in "A Unified Three-Terminal Switch Model for Current Mode Controls" by Yan et al., IEEE Trans. Power Electron., February 2012, which is hereby fully incorporated by reference, that has demonstrated good accuracy up to the switching frequency. A simplified model illustrated in FIG. 4 shows the $R_e L_s C_e$ resonant tank circuit that determines the quality factor, Q, of the double pole at one-half of the switching frequency in the control-to-inductor current transfer function $i_L(s)/v_c(s)$ for peak current mode control. It has been found by the inventors that this expression for Q is universally applicable to buck, boost, buck-boost and other topologies although different expressions for $s_n$ and $s_f$ are required for particular topologies. That is, $$Q = R_e \sqrt{\frac{C_e}{L_e}} = \frac{1}{\pi\left(\frac{s_n + s_e}{s_n + s_f} - 0.5\right)} > 0$$

where $$R_e = L_s / \left[T_{sw}\left(\frac{s_n + s_e}{s_n + s_f} - 0.5\right)\right]$$

and $$C_e = T_{sw}^2 / L_s \pi^2$$

Through this expression for Q, the inventors have discovered that if the external ramp is tuned with the real current slope change ($s_n$, $s_f$) the quality factor can be well-controlled and that, since all possible variations of the current slope change are captured in the real current signal, regardless of whether those variations arise from the variations in the duty cycle, component value change, topology change or any combination thereof, even though different expressions for $s_n$ and $s_f$ are necessary for analysis of particular topologies, computation for evaluation of those different expressions need not be made to implement current mode control in accordance with the invention since those slope values can be directly captured from a signal corresponding to the power converter output current.

Figure 5A:
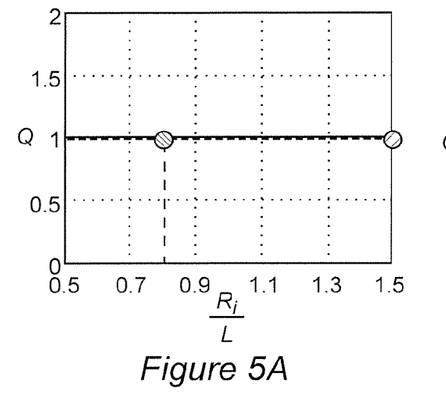
Figure 5B:
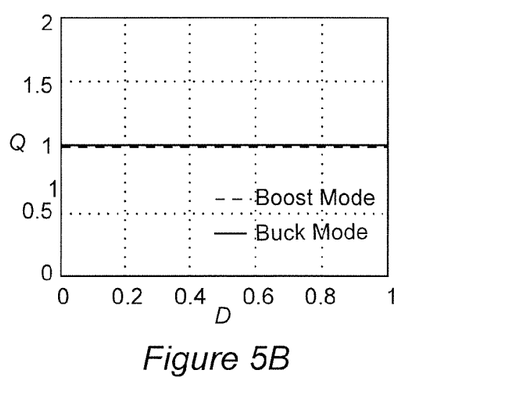

That is, the autotuning in accordance with the invention can be based upon obtaining the real slope change which can be obtained simply by differentiating the real current feedback signal and then sampling and holding the two slope values from which the external ramp for the desired quality factor, Q, can be calculated from $$s_e = ((1/Q\pi) + 0.5)s_f + ((1/Q\pi) - 0.5)s_n \quad (2)$$

which involves only two multiplications by constant values and summing the results. For example, if it is desired that Q=1, $$s_e \approx 0.82 s_f + 0.18 s_n$$

where the slope values can be derived directly from the current feedback loop of the converter circuit. Further, if the current feedback loop signal is sampled at a location that includes the effects of transfer function Ri/L, variation of Ri/L over a range of 80% to 150% of a nominal value or even much larger will be automatically compensated and Q will be immune from such variations and well as variations due to the current sensing method or hardware such as DCR current sensing, a sensing technique that obtains a current signal on an equivalent DC resistance of the inductor, sensing resistor, sensing transformer or inductive coils. The immunity to sources of feedback signal variation is illustrated in FIG. 5A. Additionally, when the converter topology changes due to a change in operational mode, such as a change from buck mode to boost mode of a buck-boost converter, the external ramp equation (2) still holds and will continue tracking to provide a constant quality factor over a wide duty cycle range as illustrated in FIG. 5B.

Figure 6:
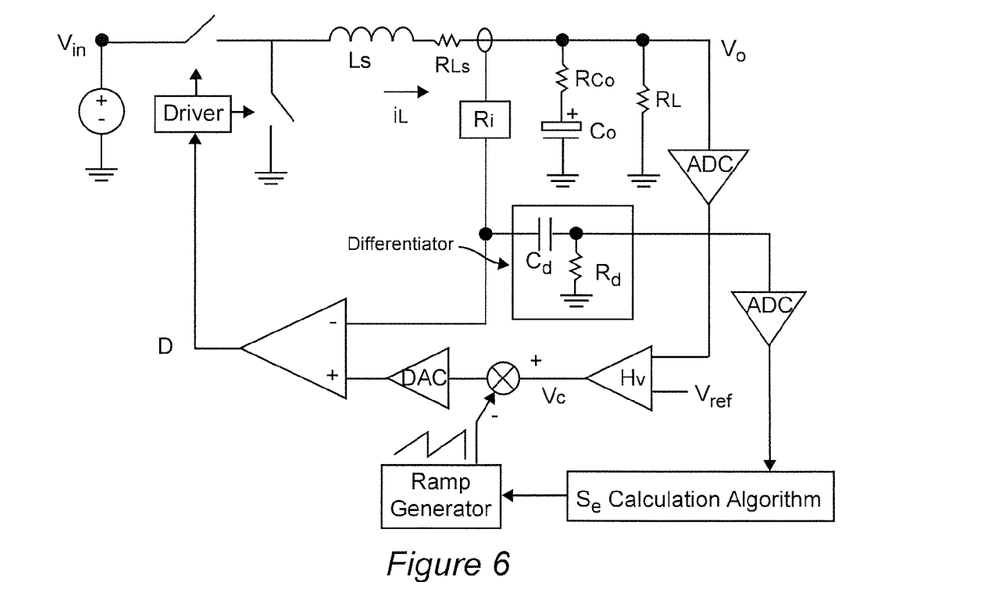
FIG. 6 is a schematic diagram of a power converter including a digital autotuning block in accordance with the invention.

The invention also can be implemented simply in either analog or digital form. In this regard, it should be appreciated that many commercially available controllers have a digital outer-loop compensator, an analog inner current feedback loop and an external ramp generator built into the digital loop. As shown in FIG. 6, the invention can be retrofit to those controllers by connecting a differentiator circuit to the analog feedback signal, $V_x$, to obtain the real current slope and using an analog-to-digital converter (ADC) available within the controller to sample the slope twice per sampling period, triggered by the edges of the variable duty cycle PWM signal to obtain the two settled slope values from which the external ramp slope, $s_e$ can be calculated in accordance with equation (2). This arrangement shown in FIG. 6 is also suitable for all digital implementations of the invention as well as modification of commercially available controllers Thus, compared with the emulated reference approach summarized above, the invention provides much improved tracking performance with fewer ADCs and a much simplified and rapidly calculable algorithm.

Figure 7:
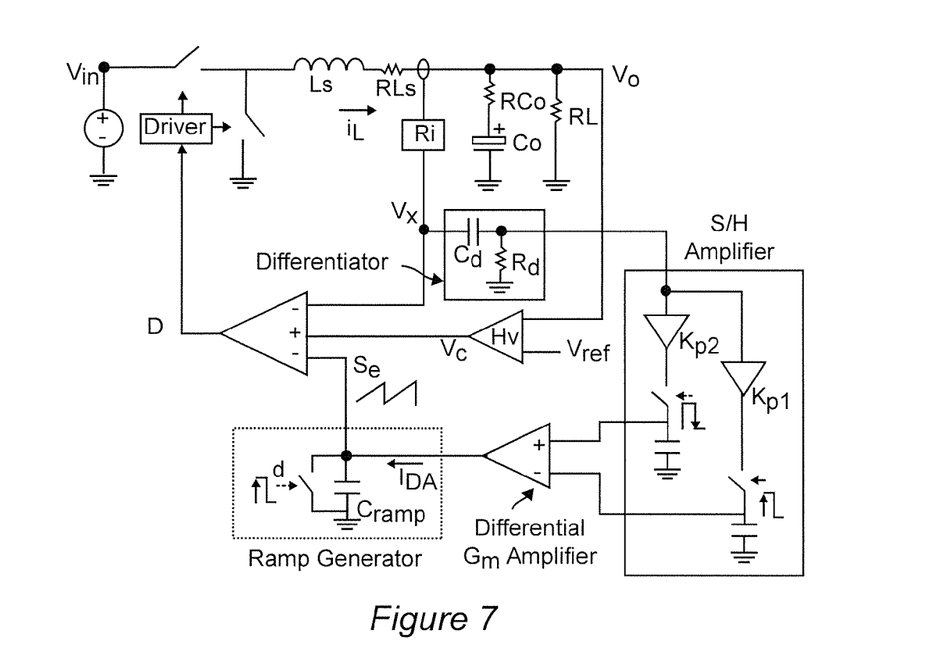
FIG. 7 is a schematic diagram of a power converter including an analog autotuning block in accordance with the invention.

Referring now to FIG. 7, it should also be appreciated that the external ramp generator of many commercially available current mode controllers has used a current source to charge the ramp capacitor and reset the external ramp generator at the rising edge of the variable duty cycle PWM control signal. An analog implementation of the invention can be retrofit into commercial analog current-mode controllers either externally or monolithically by connecting the differentiator circuit as discussed above in connection with FIG. 6 and using two sample-and-hold amplifiers with different gains, $K_{p1}$ and $K_{p2}$, triggered by the rising and falling edges of the variable duty cycle control signal, respectively, to obtain the two settled slope values already multiplied by the respective constant gains. The ramp capacitor can then be charged by changing the current sources level using a differential transconductance amplifier to change the charge rate and the external ramp slope. This circuit achieves the desired external ramp equation by designing the circuit parameters for the two constants in equation (2) in accordance with $$((1/Q\pi)+0.5)=G_m K_d K_{p1}/C_{ramp} \tag{3}$$

and $$((1/Q\pi)-0.5)=G_m K_d K_{p2}/C_{ramp} \tag{4}$$

where $K_d$ is the gain of the differentiator, $K_{p1}$ and $K_{p2}$ are scaling gains, $G_m$ is the transconductance of the differential transconductance amplifier and $C_{ramp}$ is the capacitance of the ramp capacitor. It should be noted that in the special case of $Q=2/\pi$, only one sample-and-hold amplifier is sufficient because the constant for $S_n$ is zero but the phase boost is smaller than $2/\pi < Q < 1$.

The invention can also be used in valley current-mode control in which subharmonic oscillation occurs when D<0.5, as well as in average current-mode control. The implementation for valley current mode control is essentially the same as for peak current mode control described above with the only difference being in circuit parameter design for implementing equation (2), above. That is, for valley current-mode control, the expression for Q is $$Q=1/(\pi((s_f+s_e)/(s_n+s_f))-0.5) \tag{5}$$

and the external ramp equation is $$S_e=((1/Q\pi)+0.5)S_n+((1/Q\pi)-0.5)S_f \tag{6}$$

The digital and analog implementations are therefore similar to the peak current-mode control, described above but, comparing equation (6) for valley current mode control with equation (2) for peak current mode control, $s_f$ and $s_n$ are interchanged. Therefore the $S_e$ calculation of the digital implementation of FIG. 6 should be changed to equation (6) and, for an analog implementation illustrated in FIG. 7, the parameter design should be changed to $$((1/Q\pi)-0.5=G_m K_d K_{p1}/C_{ramp} \tag{7}$$

and $$((1/Q\pi)+0.5=G_m K_d K_{p2}/C_{ramp} \tag{8}$$

Figure 8:
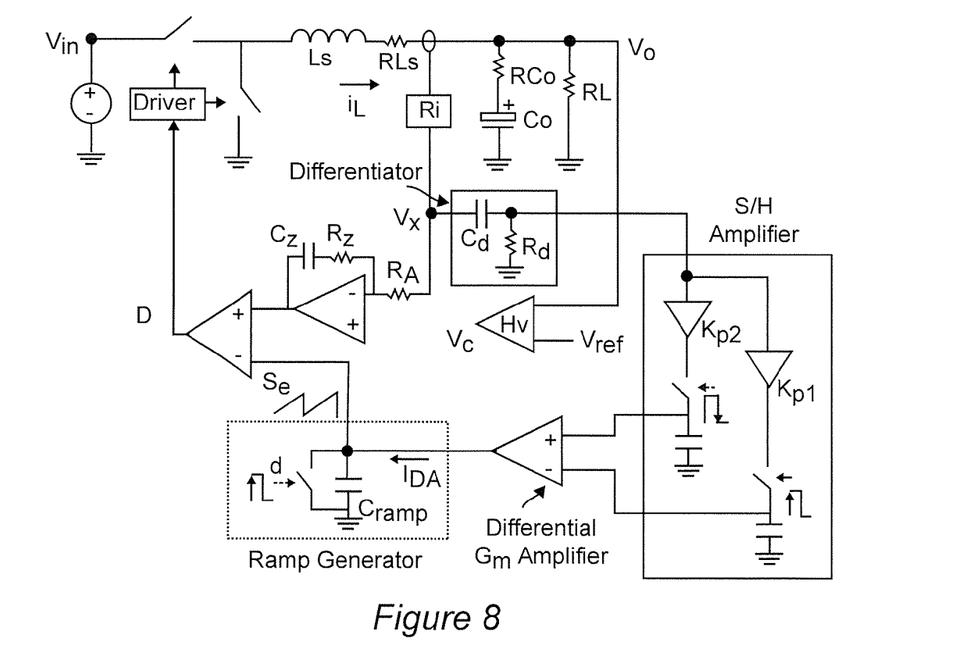
FIG. 8 is a schematic diagram illustrating application of the invention to an average current mode control, FIGS. 9A and 9B graphically illustrate waveforms of feedback signals in a simulation of the power converter of FIG. 8, FIGS. 10A and 10B are measured waveforms corresponding to the simulated waveforms of FIGS. 9A and 9B, FIGS. 11 and 12 contain tables showing results of simulations of digital and analog implementations of the invention, respectively.

Referring now to FIG. 8, average current-mode control has an additional current loop compensator formed with $C_Z$, $R_Z$, $R_A$ and an amplifier which can be designed to maintain a flat gain characteristic of the control-to-inductor current transfer function such that the converter performs as a voltage controlled current source. The quality factor, Q, equation for the double pole at one-half the switching frequency is similar to equation (1) but where the equivalent slope is amplified by $R_Z/R_A$ as described in "Analysis and Design of Average Current Model Control Using Describing Function-Based Equivalent Circuit Mode" by Yan et al., IEEE Treans, Power Electron., October 2013, which is hereby fully incorporated by reference. However, in that publication, the external ramp design is fixed and the flat gain characteristic is limited by over-compensation under a wide duty cycle range, whereas the flat gain characteristic can extend to one-half the switching frequency in accordance with the invention by connecting the autotuning block comprising a differentiator, a pair of sample-and-hold amplifiers and transconductance amplifier to $V_x$ and designing the parameters as:

$$((1/Q\pi)+0.5)=(G_m K_d K_{p1}/C_{ramp})(R_A/R_Z) \tag{9}$$

and $$((1/Q\pi)-0.5)=(G_m K_d K_{p2}/C_{ramp})(R_A/R_Z) \tag{10}$$

Figure 9A:
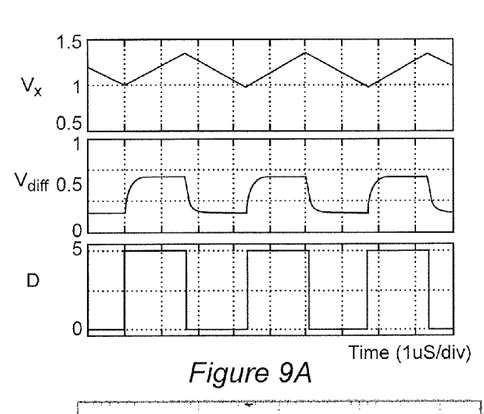
Figure 9B:
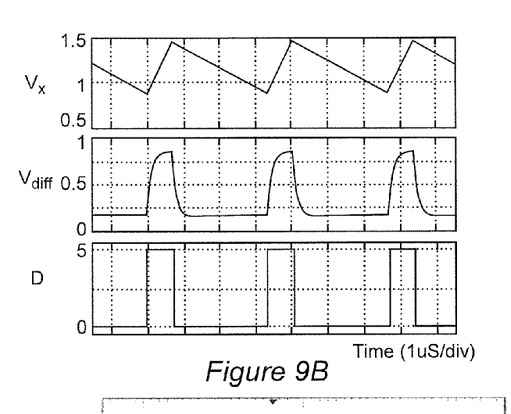
Figure 10A:
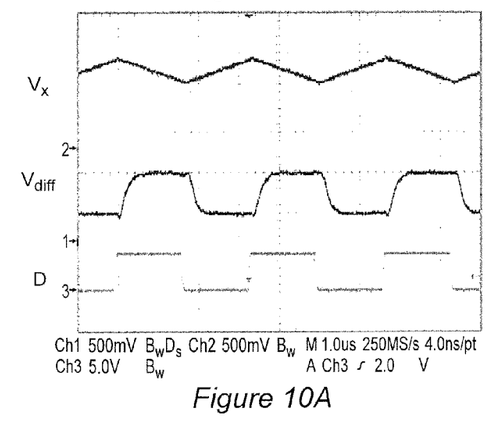
Figure 10B:
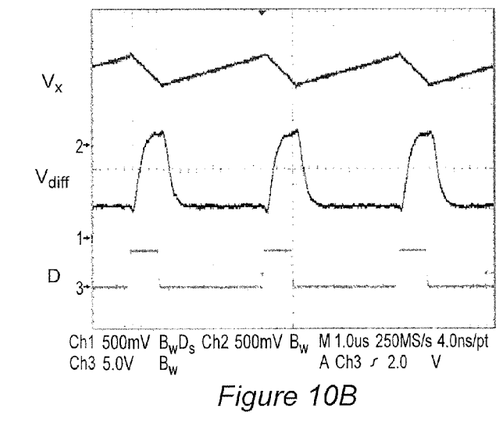

The effectiveness of the invention to produce good tracking of duty cycle while maintaining substantially constant quality factor, Q, under changes of duty cycle, component value tolerance or operational topology of the controlled power converter has been demonstrated by simulation of a four switch buck-boost converter in peak current-mode control including a digital implementation of the autotuning block in accordance with the invention for tracking Q=1 with $V_{in}$=2V~16V, $V_o$=3.3V, L=600 nH, Ri=40 mΩ, $C_d$=390 pF (C0G, a dielectric material commonly used for ceramic capacitors in the pF range), $R_d$=256Ω (thin film B tolerance), an eight-bit ADC with 4 mV resolution and a signal conditioning circuit with a gain of five and level shift to 0.5V. FIGS. 9A and 9B show the waveforms of the current feedback signal $V_x$, the differentiated signal, $V_{diff}$, and the duty cycles signal D in 0.5 and 0.2, respectively. Experimental results are shown in FIGS. 10A and 10B and agree well with the simulation results shown in FIGS. 9A and 9B.

Figure 11:
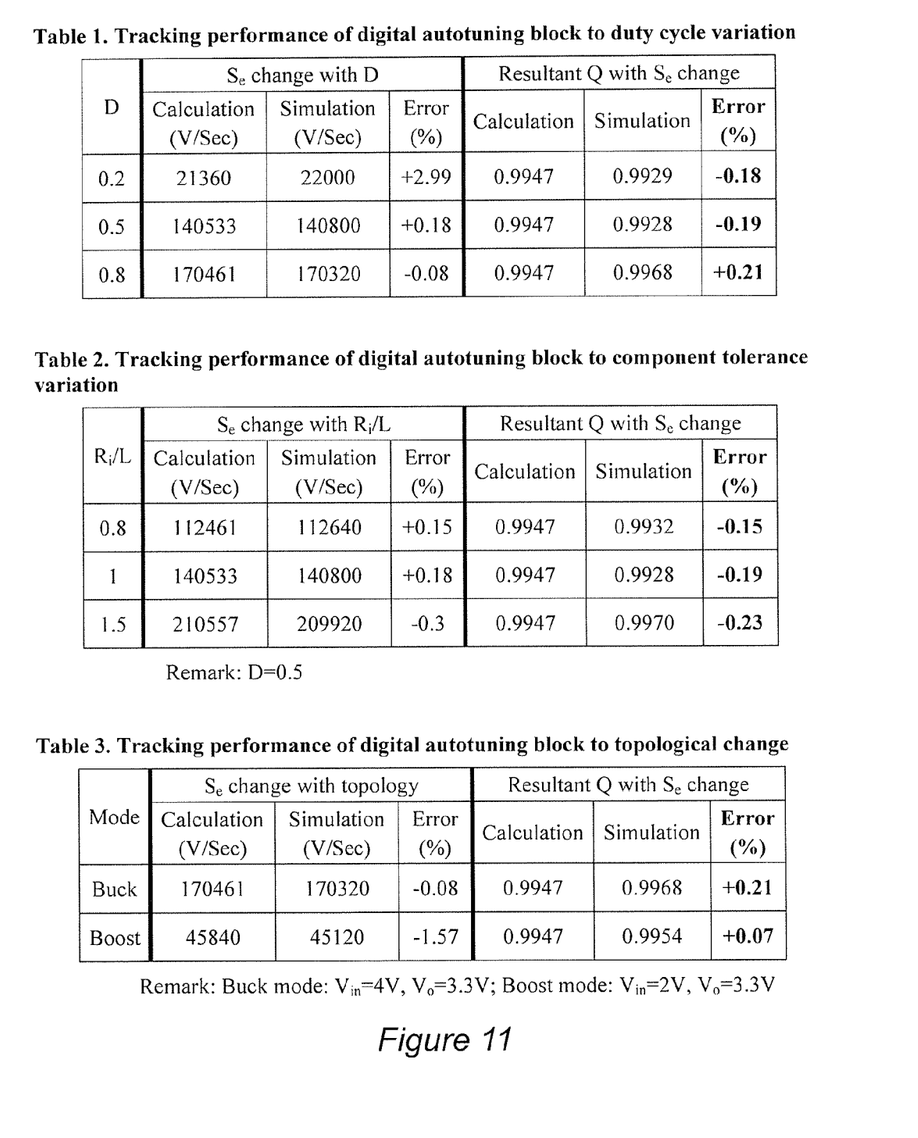

Tables 1-3 in FIG. 11 show a comparison of the simulated external ramp slope and quality factor with the calculated values and the difference/error between them for changes in duty cycle, Ri/L (e.g. component tolerance) and change of operation topology. All errors are negligible except where duty cycle is very small, resulting in a small amplitude $V_x$ signal. Even in that case the error in Q is negligible since the sharp $s_f$ overwhelms the small error in $s_e$.

Figure 12:
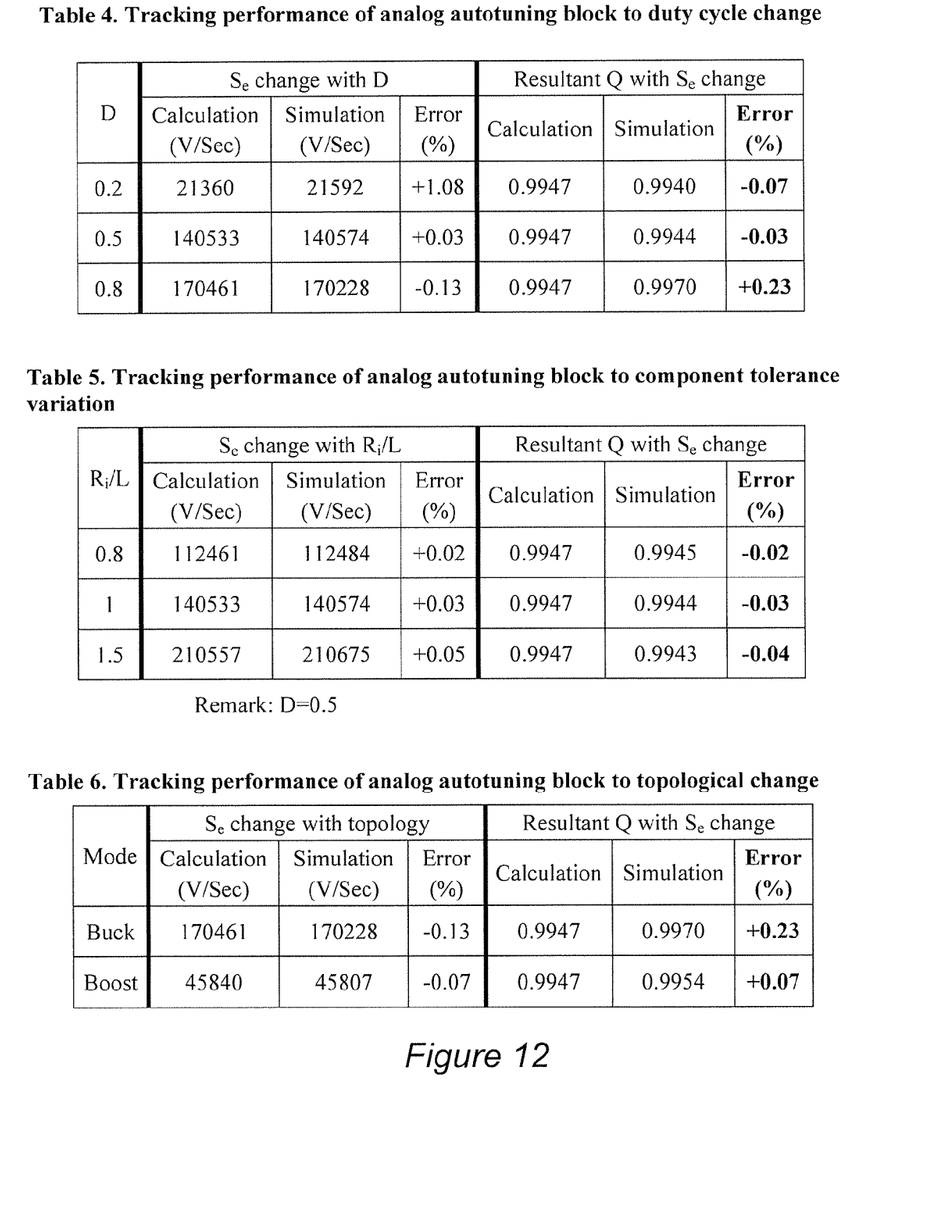
Figure 13A:
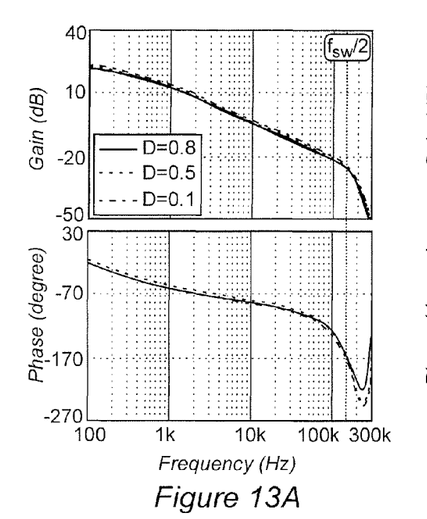
FIGS. 13A, 13B, 14A and 14B are measured control-to-output voltage transfer functions for digital and analog embodiments of the invention, respectively.
Figure 13B:
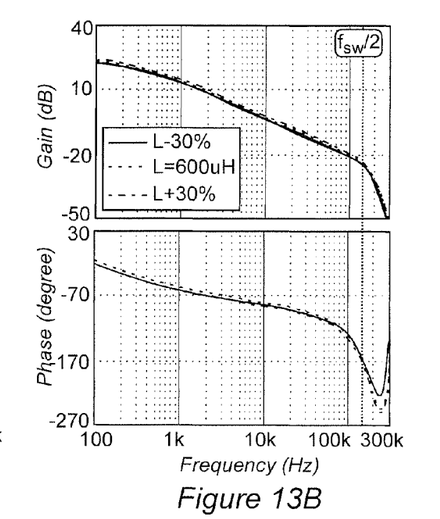
Figure 14A:
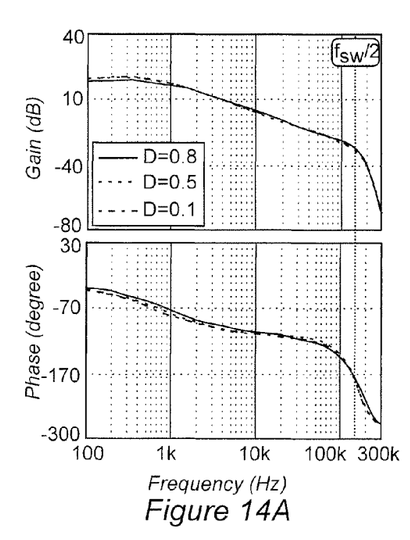
Figure 14B:
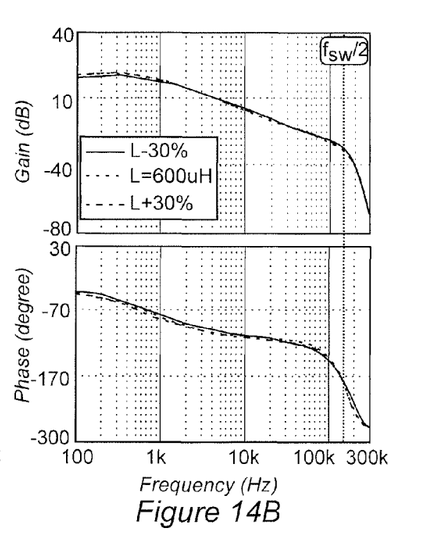

Another simulation of a buck-boost converter including an analog implementation of the autotuning block in accordance with the invention for tracking Q=1 using the same voltages and component values as in the above-described simulation but with $K_{p1}$=1.1, $K_{p2}$=5, $G_m$=8200 μS, and $C_{ramp}$=5 nF with the tolerance of the gains and transconductance controlled by trimming. Tables 4-6 of FIG. 12 show even smaller errors for the analog implementation than in the simulation of the digital implementation of the invention.

As further experimental verification of the effectiveness of the invention to provide excellent ramp autotuning that tracks Q=1 accurately and unconditionally, the control-to-output voltage transfer functions under widely varying duty cycle and inductance variation for both digital and analog implementations of the invention and are shown in FIGS. 13A-14B for the digital and analog implementations, respectively. The variation in transfer function for duty cycle variation from 0.1 to 0.8 and for inductor value variation of ±30% from a nominal value is clearly seen to be negligible. Of at least equal importance, it is evident that the transfer functions of digital and analog implementations of the invention are virtually identical, clearly validating the principles of operation of the invention as discussed above as well as the robustness of the invention to overcome the problems and complexities of known approaches to current mode control of power converters.

Figure 15:
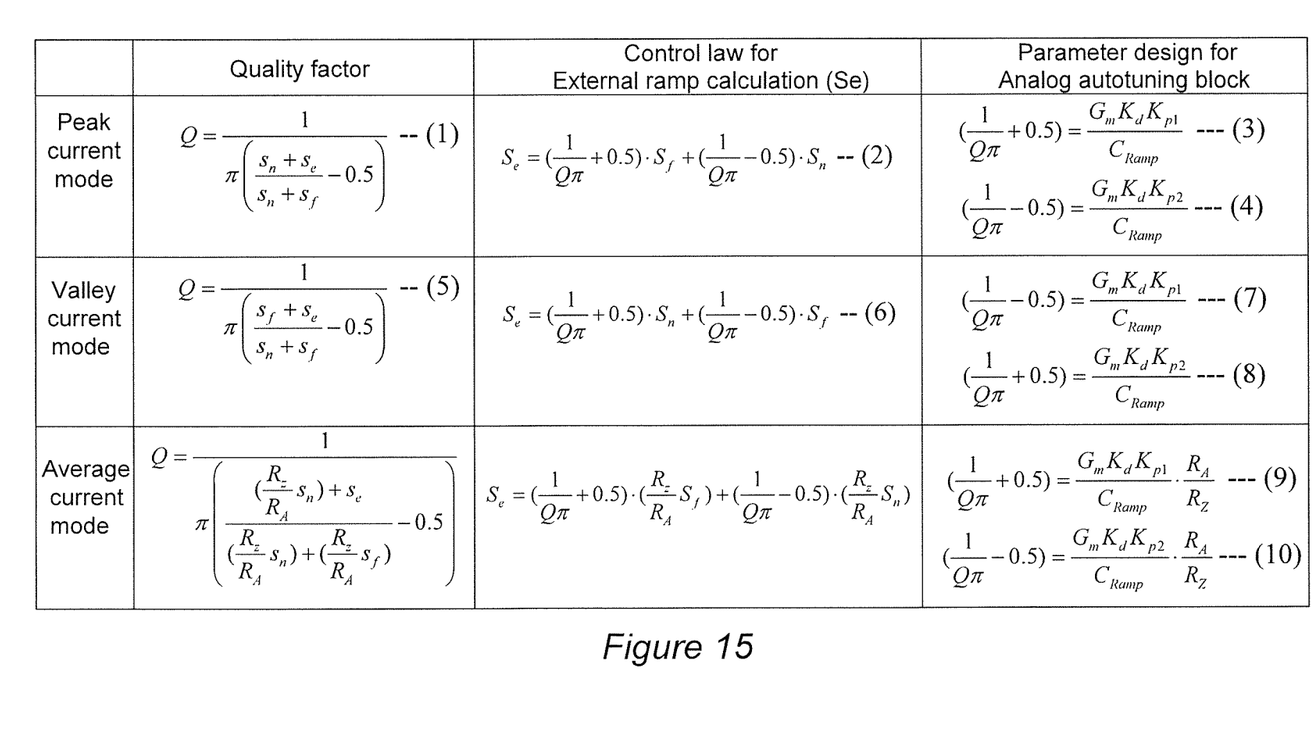
FIG. 15 is a summary of computations of quality factor, external ramp slope and external ramp generator design parameters for digital and analog implementations of the invention.

Thus, in summary, the invention provides unconditional and automatic tuning of the slope of an external ramp generator that stabilizes operation of a current mode control of a power converter while avoiding overcompensation and which is substantially immune from variation in duty cycle, component value or change in converter circuit topology and which can maintain a constant quality factor of a double pole in the transfer function. The invention can be implemented in digital form with a simple digital calculation based on two constants or analog form by design of external ramp generator parameters and, in either digital or analog implementation, can utilize peak current tracking, valley current tracking or average current tracking by choice of appropriate equations for slope calculation or ramp generator parameters which are summarized in matrix form in FIG. 15.

In view of the foregoing, it is clearly seen that by obtaining the slope of the feedback signal directly by differentiating the current feedback signal, preferably including the effects of duty cycle, Ri and L, (which are subject to parameter value change during operation as well as component value variation during manufacture) and using the slope values to determine and control the external ramp slope, can provide stable operation of a peak, valley or average current-mode control with a substantially constant quality factor value, Q, of the double pole of the current feedback transfer function over a wide range of duty cycle and with substantial immunity to effects of component value tolerance and changes of converter topology. The autotuning of the external ramp slope is completely automatic and of high accuracy without requirement for detection of operational mode or compensation of component value changes due to ambient and/or operational conditions or manufacturing variation or tolerances. The autotuning block can be the basis for manufacture of current-mode controlled power converters or current-mode controllers and can be retrofit into commercial devices of either type.

While the invention has been described in terms of a single preferred embodiment, those skilled in the art will recognize that the invention can be practiced with modification within the spirit and scope of the appended claims.

The invention claimed is:

1. An autotuning arrangement for an external ramp generator for stabilizing a current controller for a DC-DC power converter including a feedback path including current sensing gain, said autotuning arrangement comprising:
   a differentiator circuit responsive to a voltage at an output of said feedback path including current sensing gain to produce a waveform having values directly corresponding to positive-going and negative-going slopes, respectively, of a measured, substantially triangular inductor current waveform in a current feedback loop of a DC-DC power converter,
   a sampling circuit to determine and store said values of said waveform directly corresponding to said positive-going and negative-going slopes of said measured, substantially triangular waveform in said current feedback loop, and
   means for controlling a slope of an external ramp waveform required to produce a desired quality factor value in a transfer function of said current feedback loop in accordance with said values corresponding to said positive-going and negative-going slopes of said measured, substantially triangular waveform in said current feedback loop, wherein said sampling circuit comprises
   a first sampling circuit, and
   a second sampling circuit, wherein said first sampling circuit and said second sampling circuit are respectively triggered by respective edges of a variable duty cycle pulse width modulated (PWM) signal such that said values corresponding to said positive-going slope and said negative-going slope are obtained by respective ones of said first and second sampling circuits.

2. The autotuning arrangement as recited in claim 1, wherein said waveform in said current feedback loop includes effects of a transfer function of said current feedback loop.

3. The autotuning arrangement as recited in claim 2, wherein said sampling circuit to determine and store said value corresponding to said slope is included in an analog-to-digital converter.

4. The autotuning arrangement as recited in claim 1, wherein said sampling circuit to determine and store said value corresponding to said slope is included in an analog-to-digital converter.

5. A DC-DC power converter having current mode control comprising:
   a power converter circuit having an inductor current feedback path including current sensing gain, an external ramp generator for stabilizing said power converter, and
   an autotuning arrangement to automatically tune a slope of an output waveform of said external ramp generator, said autotuning arrangement comprising:
   a differentiator circuit responsive to a voltage at an output of said feedback path having current sensing gain to produce a waveform having values directly corresponding to positive-going and negative-going slopes, respectively, of a measured, substantially triangular waveform in said inductor current feedback loop of said DC-DC power converter,
   a sampling circuit to determine and store said values of said waveform directly corresponding to said positive-going and negative-going slopes of said measured, substantially triangular waveform in said current feedback loop, and
   means for controlling a slope of an external ramp waveform required to produce a desired quality factor value in a transfer function of said current feedback loop in accordance with said values corresponding to said positive-going and negative-going slopes of said measured, substantially triangular waveform in said current feedback loop, wherein said sampling circuit comprises
   a first sampling circuit, and
   a second sampling circuit, wherein said first sampling circuit and said second sampling circuit are respectively triggered by respective edges of a variable duty cycle pulse width modulated (PWM) signal such that said values corresponding to said positive-going slope and negative-going slope are obtained by respective ones of said first and second sampling circuits.

6. The power converter as recited in claim 5, wherein said waveform in said current feedback loop includes effects of a transfer function of said current feedback loop.

7. The power converter as recited in claim 6, wherein said sampling circuit to determine and store said value corresponding to said slope is included in an analog-to-digital converter.

8. The power converter as recited in claim 5, wherein said sampling circuit to determine and store said value corresponding to said slope is included in an analog to digital converter.

* * * * *